(12) United States Patent
Tsai

(10) Patent No.: US 8,027,968 B2
(45) Date of Patent: Sep. 27, 2011

(54) DATA STORAGE METHOD AND RELATED DEVICE FOR AN ELECTRONIC DEVICE

(75) Inventor: Chia-Ching Tsai, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 397 days.

(21) Appl. No.: 12/187,385

(22) Filed: Aug. 7, 2008

(65) Prior Publication Data

US 2009/0254595 A1    Oct. 8, 2009

(30) Foreign Application Priority Data

Apr. 3, 2008    (TW) ................................ 97112177 A

(51) Int. Cl.
*G06F 17/30* (2006.01)
*G06F 7/00* (2006.01)
(52) U.S. Cl. ......... 707/711; 707/803; 707/812; 707/822
(58) Field of Classification Search .......................... None
See application file for complete search history.

(56) References Cited

U.S. PATENT DOCUMENTS

| | | | | |
|---|---|---|---|---|
| 5,261,028 A * | 11/1993 | Ueda | .............................. | 345/419 |
| 5,511,094 A * | 4/1996 | Lee et al. | ....................... | 375/243 |
| 6,567,817 B1 * | 5/2003 | VanLeer | ................................ | 1/1 |
| 6,665,566 B1 * | 12/2003 | Shibata et al. | ..................... | 700/7 |
| 6,868,008 B2 * | 3/2005 | Kamei et al. | ............. | 365/185.09 |
| 7,139,864 B2 * | 11/2006 | Bennett et al. | ................. | 711/103 |
| 7,725,004 B2 * | 5/2010 | Ohishi | ........................ | 386/343 |
| 2002/0059185 A1 * | 5/2002 | Woo | ................................... | 707/1 |
| 2004/0107309 A1 * | 6/2004 | Iida et al. | ....................... | 711/103 |
| 2005/0157217 A1 * | 7/2005 | Hendricks | ..................... | 348/734 |

* cited by examiner

*Primary Examiner* — Greta Robinson
*Assistant Examiner* — James J Wilcox
(74) *Attorney, Agent, or Firm* — Winston Hsu; Scott Margo

(57) ABSTRACT

In order to prevent memory cells from being damaged, the present invention provides a data storage method for an electronic device including dividing a first section of a memory of the electronic device into N blocks, wherein the N blocks is a sequence of blocks from the first block to the Nth block and each block is assigned an index value, rewriting the index value corresponding to the nth block according to index values of the N blocks, and storing an input data in the nth block, wherein N is an integer greater than 1, and $1 \leq n \leq N$.

22 Claims, 4 Drawing Sheets

DATA STORAGE METHOD AND RELATED DEVICE FOR AN ELECTRONIC DEVICE

BACKGROUND OF THE INVENTION

1. Field of the Invention

The present invention relates to a data storage method and a related device for an electronic device, and more particularly, to a method and a related device for accessing all memory cells in a cycle for preventing the memory cells from being damaged.

2. Description of the Prior Art

A non-Volatile Random Access Memory (NVRAM) is widely used as a memory for storing data in many kinds of consumer electronic products and industrial instruments. The NVRAM memory does not lose stored data when the power is off. Electrically Erasable Read-Only Memory (EEPROM) or flash memory is an example of NVRAM memories.

For example, the EEPROM memory is usually operated with an 8051 processor for accessing data in consumer electronic products such as a television, a DVD player or a projector. However, a heavy computation of error-detecting code performed when storing data decreases the efficiency of memory usage. On the other hand, there is no proper plan about the number of times of accessing the same memory cell. As a result, the system accesses some memory cells continuously so that the memory cells may be damaged by overuse, which results in an abnormal halt of the system.

From the above, the prior art memory usage cannot improve efficiency of memory usage and may decrease the system efficiency.

SUMMARY OF THE INVENTION

It is therefore a primary objective of the claimed invention to provide a data storage method and a related device for an electronic device.

The present invention discloses a data storage method for an electronic device comprising dividing a first section of a memory of the electronic device into N blocks, wherein the N blocks is a sequence of blocks from the first block to the Nth block and each block is assigned an index value, rewriting the index value corresponding to the nth block according to index values of the N blocks, and storing an input data in the nth block, wherein N is an integer greater than 1, and $1 \leq n \leq N$.

The present invention further discloses an electronic device for preventing a memory from damage comprising a reception unit for receiving an input data, a memory for storing the input data, and a processor coupled to the reception unit and the memory, for processing the input data. The processor comprises a dividing unit for dividing a first section of the memory into N blocks, wherein the N blocks is a sequence of blocks from the first block to the Nth block and each block is assigned an index value, an index control unit for rewriting the index value corresponding to the nth block according to index values of the N blocks, and a writing unit for storing an input data in the nth block, wherein N is an integer greater than 1, and $1 \leq n \leq N$.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
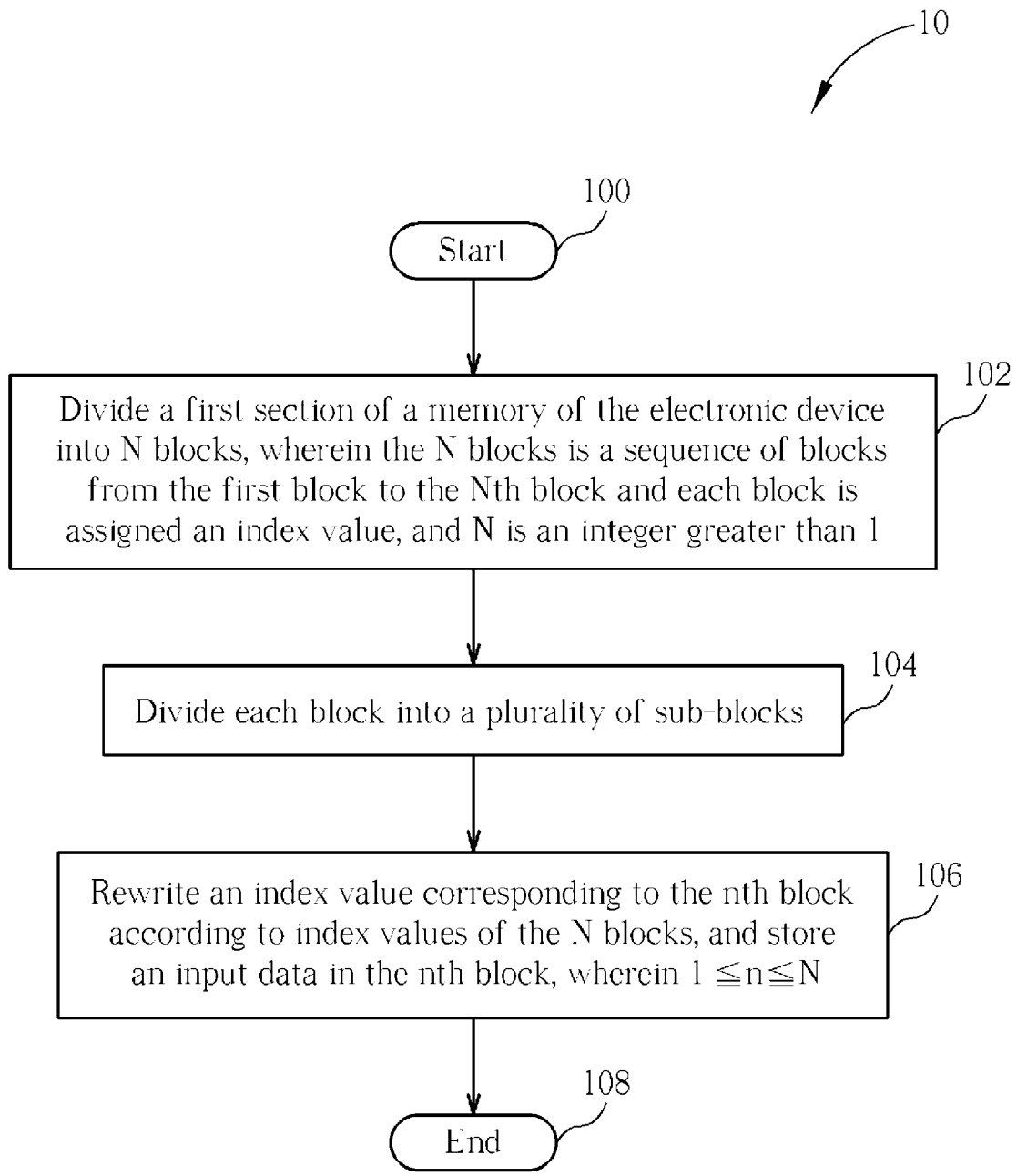
FIG. 1 is a flowchart of a process according to an embodiment of the present invention.

The present invention provides a data storage method for averaging number of times of accessing memory cells in the same section of the memory, so as to prevent the memory cells from being damaged. Please refer to FIG. 1, which is a flowchart of a process 10 according to an embodiment of the present invention. The process 10 is utilized for storing data for an electronic device and comprises the following steps:

Step 100: Start.

Step 102: Divide a first section of a memory of the electronic device into N blocks, wherein the N blocks is a sequence of blocks from the first block to the Nth block and each block is assigned an index value, and N is an integer greater than 1.

Step 104: Divide each block into a plurality of sub-blocks.

Step 106: Rewrite an index value corresponding to the nth block according to index values of the N blocks, and store an input data in the nth block, wherein $1 \leq n \leq N$.

Step 108: End.

The process 10 is described as follows. First, the memory of the electronic device is divided into many sections and one of the sections, a first section, is utilized for storing data for a large number of times of accessing. The process 10 then divides the first section into N blocks. The number of memory cells in the first section depends on requirement. Next, the process 10 divides each of the N blocks into a plurality of sub-blocks, wherein an amount of sub-blocks depends on requirement for a number of data items for heavy accessing. Note that, the N blocks form a sequence of blocks labeled from the first block to the Nth block and each block is assigned an index value. The first block can be a block including the lowest address number in the first section and the Nth block can be a block including the highest address number in the first section. Of course, the first block can be a block with the lowest address number in the first section and the Nth block can be a block with the highest address number in the first section. In the embodiment of the present invention, the N blocks form a continuous block sequence. That is, the first block is adjacent to the second block and the second block is adjacent to the third block, and so on.

In the prior art, data for a large number of times of accessing is stored in the memory without section plan. Compared with the prior art, data for a large number of times of accessing is compactly stored in the N blocks in the first section according to the present invention. Therefore, the embodiment of the present invention decreases time consumption for calculating the error-detecting code. On the other hand, the index values according to the N blocks are 0 or 1. The N blocks are used in order and the index value corresponding to a used block is rewritten after the block is used. For example, the index value transfers from 0 to 1 or from 1 to 0. Please note that the process 10 is an embodiment of the present invention, and those skilled in the art can make alterations and modifications accordingly. For example, the index value can be the result of Boolean calculation.

Figure 2:
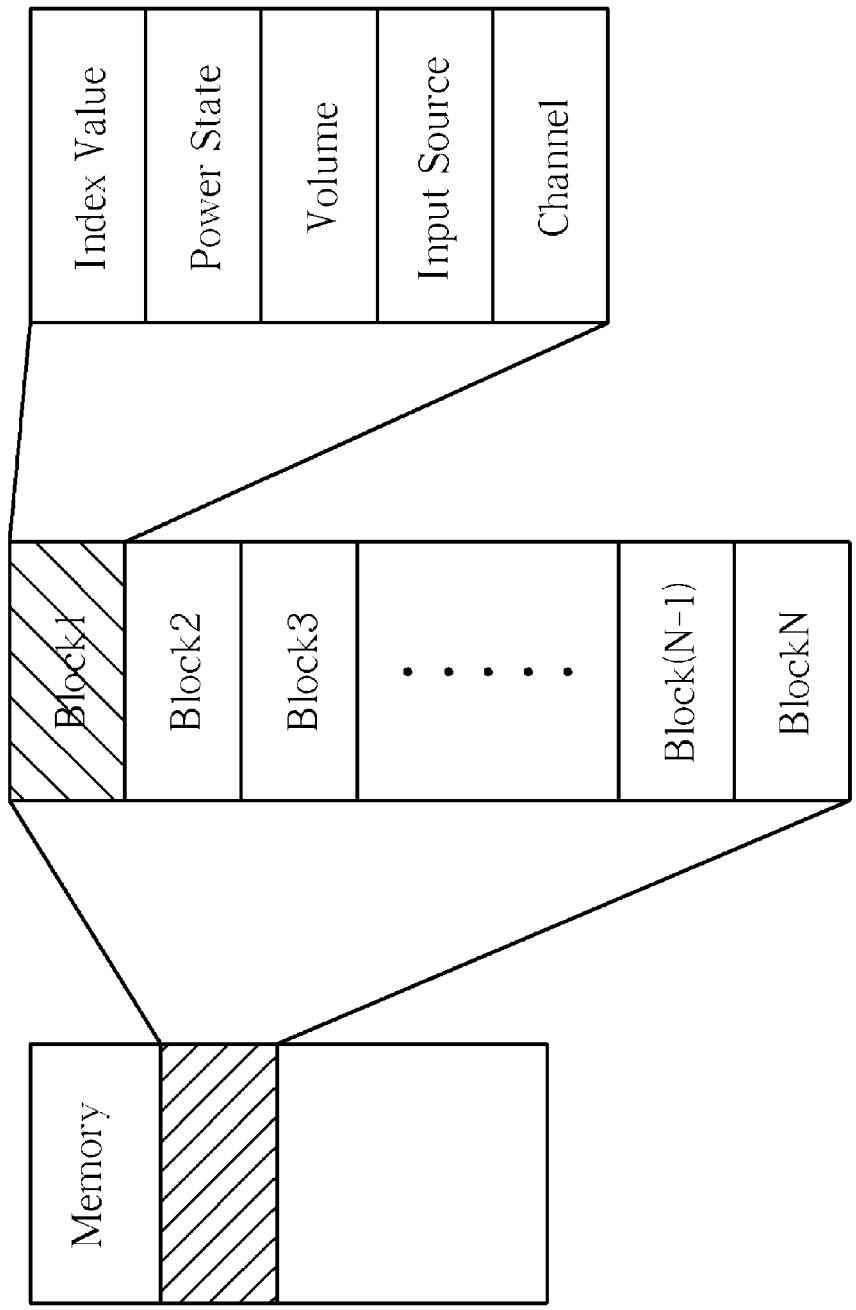
FIG. 2 is a schematic diagram of a memory division for a television remote controller using the process shown in FIG. 1.

Take a television remote controller as the electronic device for further explanation. Please refer to FIG. 2, which is a schematic diagram of a memory division of a television remote controller using the process 10. In the memory of the television remote controller, the first section is divided into N blocks and each block is divided into 5 sub-blocks for storing the index value and storing heavy accessing data, such as power state, volume, input source and channel. Each of the N blocks is utilized for storing data as above. Note that FIG. 2 is an embodiment of the present invention, and those skilled in the art can make alterations and modifications accordingly. For example, the index values of the N blocks can be stored in a second section different from the first section in the memory. When the index values in the second section are rewritten, the television remote controller can find out which block is waiting for storing data according to the index values.

Next, the process 10 rewrites the index value corresponding to the nth block according to the index values of the N blocks, and stores the input data in the nth block. The N blocks are used to store data in sequence and the index value corresponding to a used block is rewritten. Therefore, the used blocks and the next used block are known by the index values corresponding to the N blocks. For example, if N=5 and the 5 blocks correspond to index value "00111", that is, the index value corresponding to the first block is "0", and the index value corresponding to the 5th block is "1". The first block and the second block are used blocks and the third block is a next used block. The process 10 rewrites the index value "1" corresponding to the third block by "0". Next, the process 10 stores the input data in the third block.

Figure 3:
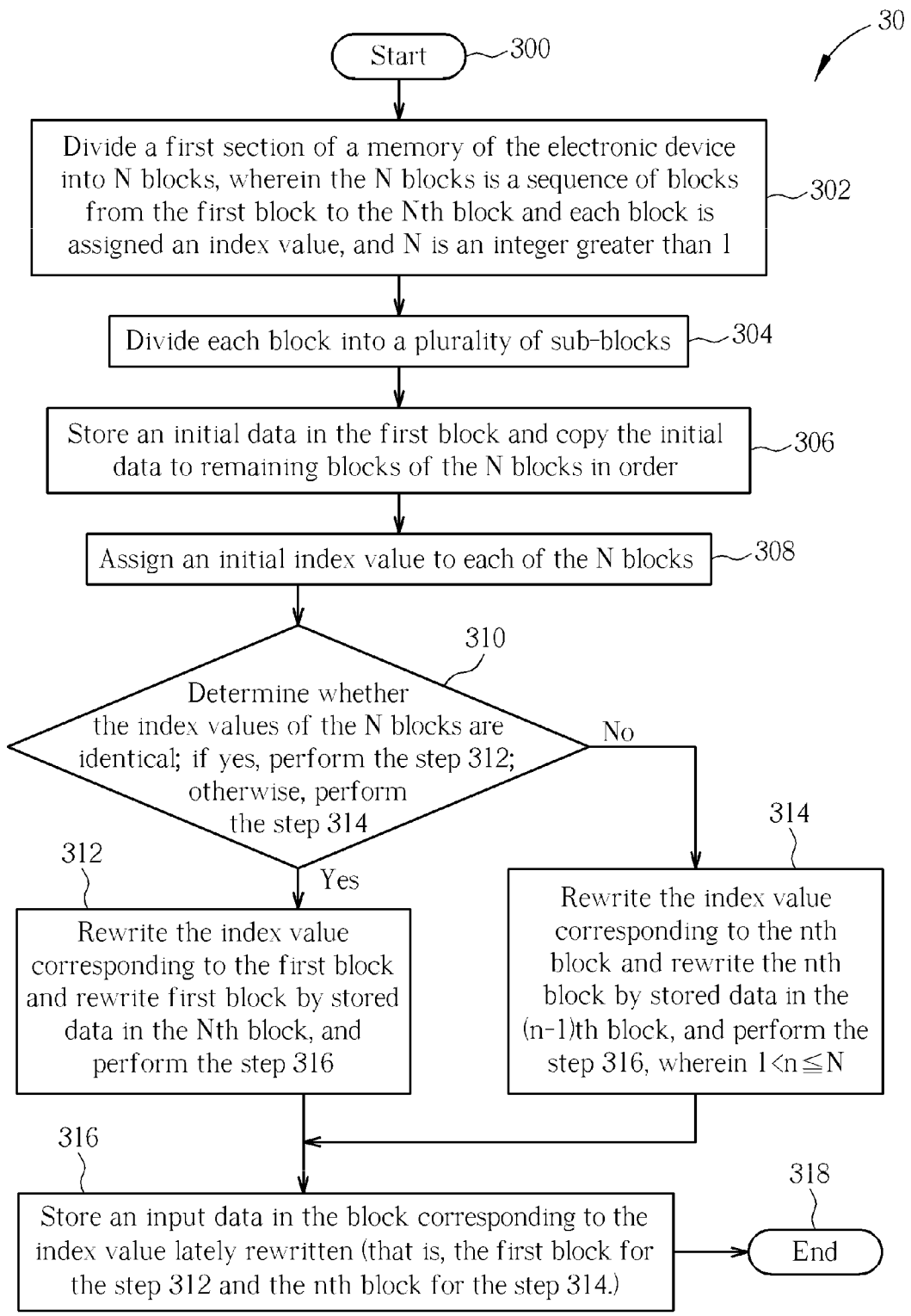
FIG. 3 is a flowchart of a process according to an embodiment of the present invention.

On the other hand, please refer to FIG. 3 for a flowchart of a process 30 according to an embodiment of the present invention. The process 30 is utilized for storing data for an electronic device. Compared with the process 10, the process 30 further comprises an initial procedure of the N blocks and a data processing procedure after rewriting the index value corresponding to the nth block. The process 30 comprises the following steps:

Step 300: Start.

Step 302: Divide a first section of a memory of the electronic device into N blocks, wherein the N blocks is a sequence of blocks from the first block to the Nth block and each block is assigned an index value, and N is an integer greater than 1.

Step 304: Divide each block into a plurality of sub-blocks.

Step 306: Store an initial data in the first block and copy the initial data to remaining blocks of the N blocks in order.

Step 308: Assign an initial index value to each of the N blocks.

Step 310: Determine whether the index values of the N blocks are identical; if yes, perform the step 312; otherwise, perform the step 314.

Step 312: Rewrite the index value corresponding to the first block and rewrite first block by stored data in the Nth block, and perform the step 316.

Step 314: Rewrite the index value corresponding to the nth block and rewrite the nth block by stored data in the (n−1)th block, and perform the step 316, wherein 1<n≦N.

Step 316: Store an input data in the block corresponding to the index value lately rewritten (that is, the first block for the step 312 and the nth block for the step 314.)

Step 318: End.

In a word, the process 10 and the process 30 average number of times of accessing memory cells in the same section of the memory. Moreover, the memory cells are used in a cycle. Therefore, the process 10 and the process 30 prevent the memory cells from being damaged. Compared with the process 10, the process 30 stores the initial data according to the step 306 and assigns the initial index value according to the step 308 after dividing each block into a plurality of sub-blocks. Next, the process 30 determines whether the index values of the N blocks are identical, for determining which block is waiting to be used. For example, if N=5 and the index values corresponding to the 5 blocks is "00000" or "11111", a new cycle of the N blocks starts. The process 30 rewrites the index value corresponding to the first block. That is, the index value "0" corresponding to the first block is rewritten by "1"; or the index value "1" corresponding to the first block is rewritten by "0". Next, the process 30 rewrites the first block by stored data in the previous block, the Nth block, and performs the step 316 for storing the input data in the first block.

If the present index values corresponding to the 5 blocks are "00000", it means the next used block is the first block. The index value corresponding to the first block is rewritten by "1" and the index values corresponding to the 5 blocks becomes "10000". After the first block is used, the next used block is the second block. The process 30 rewrites the index value corresponding to the second block. The index value corresponding to the second block is rewritten by "1" and the index values corresponding to the 5 blocks becomes "11000". Next, the process 30 rewrites the second block as stored data in the first block and then stores the input data in the second block. From the above, when the 5 blocks are used in a cycle, the index values corresponding to the 5 blocks are "00000", "10000", "11000", "11100", "11110", "11111", "01111", "00111", . . . , in turn. Note that, the process 30 is an embodiment of the present invention, and those skilled in the art can make alterations and modifications accordingly. For example, when the index values corresponding to the N blocks are stored in the second section instead of being stored in the N blocks, the N blocks do not have to be used in turn. In addition, another embodiment of the present invention present invention can also store the initial data in the nth block directly and start a cycle from the nth block instead of storing the initial data in the first block and copying the initial data to the remaining blocks of the N blocks in order.

Take a television remote controller as the electronic device for further explanation of the process 30. Suppose the first section of the memory of the television remote controller is divided into 5 blocks and each block is divided into 5 sub-blocks, as shown in FIG. 2. The 5 sub-blocks in each block is utilized for storing the index value and storing heavy accessing data, such as power state, volume, input source and channel. Suppose the initial index value is "0", the initial data includes power state "OFF", volume "50", input source "TV" and channel "12". The initial data as above is stored in each block according to the process 30. When the television remote controller is turned on at the first time, the initial index values corresponding to the 5 blocks is "00000" and the first block is used first. Next, after the index values corresponding to the 5 blocks becomes "10000", a user of the television remote controller inputs the input data via an input interface of the television remote controller, and stores the input data, such as volume or channel, in the first block based on the initial data.

If the television remote controller is turned off when stored data in the first block includes power state "OFF", volume "40", input source "Video" and channel "20", the television remote controller is going to use the second block for storing the input data when the television remote controller is turned on again. That is, the television remote controller rewrites the index value of the second block according to the process 30, and the index value corresponding the 5 blocks becomes "11000". The television remote controller rewrites the second block by stored data in the first block. That is, the data including power state "OFF", volume "40", input source "Video" and channel "20" is stored in the second block. Next, the user inputs the input data via the input interface and then stores the input data in the second block based on the store data in the first block. Please note that, the step of rewriting the nth block by stored data in the (n−1)th block is executed after the television remote controller is turned on. After that, all input data are stored in the nth block until the television remote controller is turned off. The (n+1)th block is used after the television remote controller is turned on again. The television remote controller is an application of the embodiment of the present invention, and the embodiment of the present invention is not limited to any specific electronic device.

Figure 4:
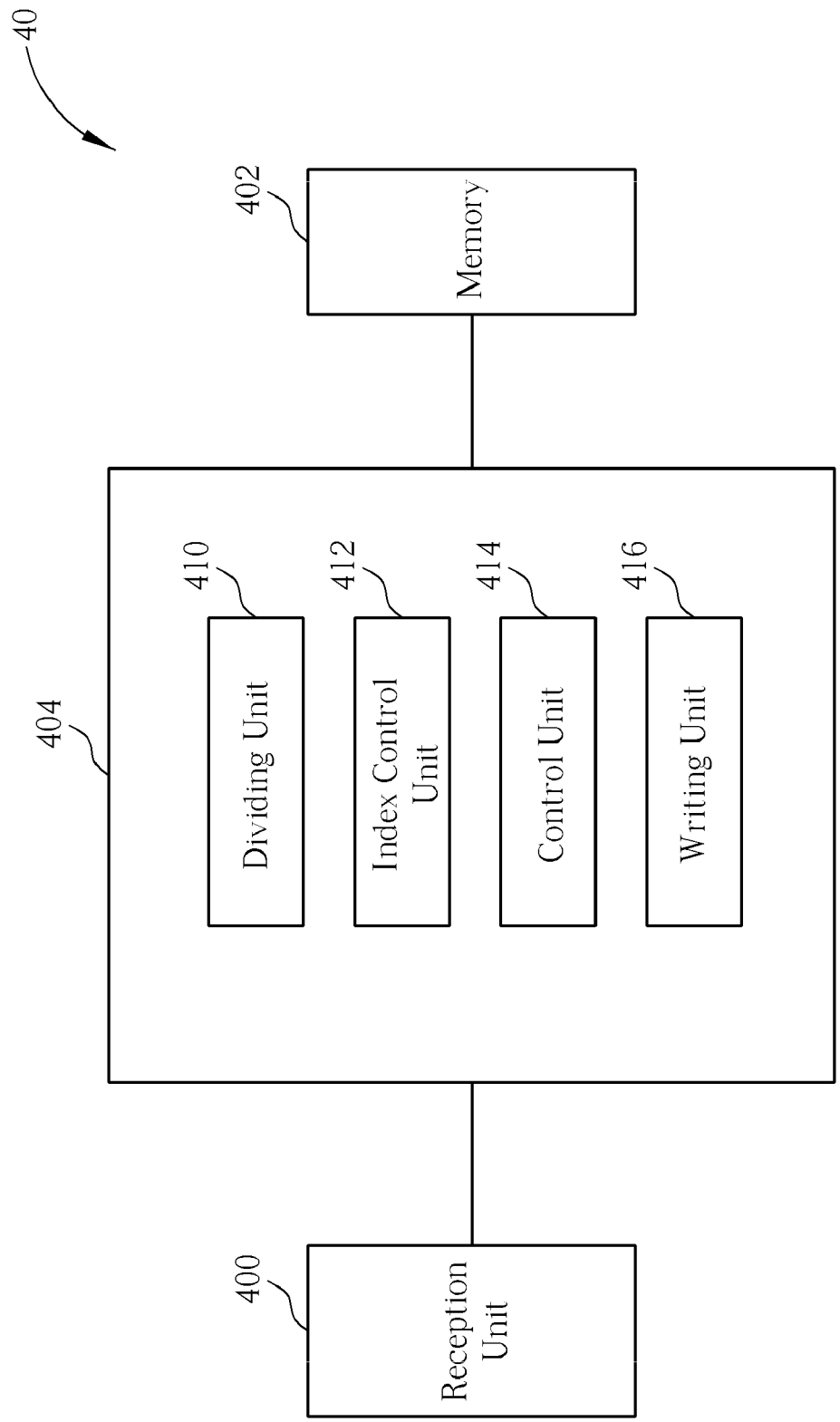
FIG. 4 is a schematic diagram of an electronic device according to an embodiment of the present invention.

For the hardware implementation of the process 10 or the process 30, please refer to FIG. 4. FIG. 4 is a schematic diagram of an electronic device 40 according to an embodiment of the present invention. The electronic device 40 comprises a reception unit 400, a memory 402 and a processor 404. The reception unit 400 is utilized for receiving an input data. The memory 402 is utilized for storing the input data. The processor 404 is coupled to the reception unit 400 and the memory 402 and is utilized for processing the input data for preventing the memory 402 from being damaged. The processor 404 comprises a dividing unit 410, an index control unit 412, a control unit 414 and a writing unit 416. The dividing unit 410 is utilized for dividing a first section of the memory 404 into N blocks and dividing each of the N blocks into a plurality of sub-blocks, wherein the N blocks is a sequence of blocks from the first block to the Nth block and each block is assigned an index value, and N is an integer larger than 1. The index control unit 412 is utilized for rewriting the index value corresponding to the nth block according to index values corresponding to the N blocks. The control unit 414 is utilized for rewriting the nth block by stored data in the (n−1)th block according to whether the index values corresponding to the N blocks are identical, wherein 1<n≦N. When the index values corresponding to the N blocks are identical, which means the control unit 414 rewrites the first block by stored data in the Nth block. On the other hand, when the index values corresponding to the N blocks are not identical, the control unit 414 rewrites the nth block by stored data in the (n−1)th block. The writing unit 416 is utilized for storing an input data in the nth block.

The operations of the dividing unit 410, the index control unit 412, the control unit 414 and the writing unit 416 are described in the process 30 and are not given here. The electronic device 40 can be a television remote controller, for example. In addition, the control unit 414 rewrites the nth block by stored data in the (n−1)th block only after the electronic device 40 is turned on. That is, the N blocks are used in a cycle after the electronic device 40 is turned on. As a result, the electronic device 40 averages number of times of accessing memory cells in the same section of the memory 402, so as to prevent the memory 402 from being damaged. Note that the electronic device 40 can be any kind of electronic equipment or industrial instrument and is not limited to specific electronic device.

In conclusion, the embodiment of the present invention divides a section of a memory into N blocks for storing data requiring a large number of times of accessing memory cells. Moreover, the N blocks are used in a cycle for averaging consumption of memory cells, so as to prevent memory cells from being damaged. From the embodiments of the present invention as above, the initial data is stored in the first block and the initial data is stored in the remaining blocks of the N blocks in order. Note that the initial data can be only stored in any block of the N blocks in another embodiment of the present invention.

Those skilled in the art will readily observe that numerous modifications and alterations of the device and method may be made while retaining the teachings of the invention.

What is claimed is:

1. A data storage method for an electronic device, the data storage method comprising:
    averaging a number of times of accessing sections of a memory of the electronic device in order to prevent the memory from being damaged;
    dividing a first section of the memory of the electronic device into N blocks, wherein each of the N blocks is corresponding to a sequence number and assigned an index value;
    rewriting an assigned index value corresponding to an nth block of the N blocks according to index values corresponding to the N blocks;
    storing an input data in the nth block; and
    rewriting the nth block by stored data in the (n−1)th block before storing the input data in the nth block when the index values corresponding to the N blocks are not identical;
    wherein N is an integer greater than or equal to 1, and 1≦n≦N.

2. The data storage method of claim 1, wherein n is equal to 1 when the index values corresponding to the N blocks are identical.

3. The data storage method of claim 2 further comprising:
    rewriting the first block by stored data in the Nth block before storing the input data in the first block.

4. The data storage method of claim 3, wherein the step of rewriting the first block by stored data in the Nth block is executed when the electronic device is turned on.

5. The data storage method of claim 1, wherein the step of rewriting the nth block by stored data in the (n−1)th block is executed when the electronic device is turned on.

6. The data storage method of claim 1, wherein the index value corresponding to the nth block is stored in the nth block.

7. The data storage method of claim 1, wherein index values of the N blocks are stored in a second section of the memory.

8. The data storage method of claim 1 further comprising:
    storing an initial data in the first block before each block is assigned an initial index value.

9. The data storage method of claim 1 further comprising:
    storing an initial data in the first block and copying the initial data to remaining blocks of the N blocks in order before each block is assigned an initial index value.

10. The data storage method of claim 1 further comprising:
    dividing each of the N blocks into a plurality of sub-blocks.

11. The data storage method of claim 1, wherein the electronic device is a television remote controller.

12. An electronic device for preventing a memory from damage comprising:
    a reception unit for receiving an input data;
    a memory for storing the input data; and
    a processor coupled to the reception unit and the memory, for processing the input data and for averaging a number of times of accessing sections of the memory of the electronic device in order to prevent the memory from being damaged, the processor comprising:
        a dividing unit, for dividing a first section of the memory into N blocks, wherein each of the N blocks is corresponding to a sequence number and assigned an index value;
        an index control unit coupled to the memory, for rewriting an assigned index value corresponding to an nth block of the N blocks according to index values corresponding to the N blocks;

a writing unit for storing an input data in the nth block; and a control unit for rewriting the nth block by stored data in the (n−1)th block before the input data is stored in the nth block when the index values corresponding to the N blocks are not identical;

wherein N is an integer greater than or equal to 1, and $1 \leq n \leq N$.

13. The electronic device of claim 12, wherein n is equal to 1 when the index values corresponding to the N blocks are identical.

14. The electronic device of claim 13, wherein the processor further comprises a control unit for rewriting the first block by stored data in the Nth block before the input data is stored in the first block.

15. The electronic device of claim 14, wherein the control unit executes the action of rewriting the first block by stored data in the Nth block when the electronic device is turned on.

16. The electronic device of claim 12, wherein the control unit executes the action of rewriting the nth block by stored data in the (n−1)th block when the electronic device is turned on.

17. The electronic device of claim 12, wherein the index value corresponding to the nth block is stored in the nth block.

18. The electronic device of claim 12, wherein index values corresponding to the N blocks are stored in a second section of the memory.

19. The electronic device of claim 12, wherein the processor further comprises a control unit for storing an initial data in the first block before each block is assigned an initial index value.

20. The electronic device of claim 12, wherein the processor further comprises a control unit for storing an initial data in the first block and copying the initial data to remaining blocks of the N blocks in order before each block is assigned an initial index value.

21. The electronic device of claim 12, wherein the dividing unit is further utilized for dividing each of the N blocks into a plurality of sub-blocks.

22. The electronic device of claim 12, wherein the electronic device is a television remote controller.

* * * * *